United States Patent
Kamm et al.

(10) Patent No.: US 10,822,519 B2
(45) Date of Patent: Nov. 3, 2020

(54) METHOD FOR PRODUCING COMPACT POLYURETHANES WITH IMPROVED HYDROLYTIC STABILITY

(71) Applicant: BASF SE, Ludwigshafen am Rhein (DE)

(72) Inventors: Andre Kamm, Bohmte (DE); Hans-Josef Thomas, Korschenbroich (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/556,875

(22) PCT Filed: Mar. 10, 2016

(86) PCT No.: PCT/EP2016/055095
§ 371 (c)(1),
(2) Date: Sep. 8, 2017

(87) PCT Pub. No.: WO2016/142452
PCT Pub. Date: Sep. 15, 2016

(65) Prior Publication Data
US 2018/0237657 A1 Aug. 23, 2018

(30) Foreign Application Priority Data
Mar. 11, 2015 (EP) .................... 15158590

(51) Int. Cl.
*C08G 18/50* (2006.01)
*C09D 175/04* (2006.01)
*C08G 18/76* (2006.01)
*C08G 59/50* (2006.01)
*C08G 18/66* (2006.01)
*C09D 171/02* (2006.01)
*C08G 18/48* (2006.01)
*C08G 18/79* (2006.01)
*C08G 18/32* (2006.01)
*C08G 65/333* (2006.01)
*E21B 36/00* (2006.01)

(52) U.S. Cl.
CPC ....... *C09D 175/04* (2013.01); *C08G 18/3206* (2013.01); *C08G 18/4825* (2013.01); *C08G 18/4829* (2013.01); *C08G 18/4837* (2013.01); *C08G 18/4841* (2013.01); *C08G 18/4895* (2013.01); *C08G 18/5024* (2013.01); *C08G 18/6674* (2013.01); *C08G 18/7664* (2013.01); *C08G 18/797* (2013.01); *C08G 59/504* (2013.01); *C08G 65/33306* (2013.01); *C09D 171/02* (2013.01); *C08G 2150/00* (2013.01); *E21B 36/003* (2013.01)

(58) Field of Classification Search
CPC ............ C08G 18/3206; C08G 18/4825; C08G 18/4829; C08G 18/4841; C08G 18/4895; C08G 18/5024; C08G 18/6674; C08G 18/7664; C08G 18/797; C08G 59/504; C08G 65/33306; C09D 175/04
See application file for complete search history.

(56) References Cited

U.S. PATENT DOCUMENTS

| | | | | |
|---|---|---|---|---|
| 4,419,467 A * | 12/1983 | Wismer et al. | ......... | C08L 63/02 523/414 |
| 4,585,831 A * | 4/1986 | Stamberger | .......... | C08G 18/487 525/107 |
| 4,647,624 A | 3/1987 | Stamberger | | |
| 5,053,465 A * | 10/1991 | Waddill | .................. | C08L 63/00 525/454 |
| 5,057,556 A * | 10/1991 | Redman | ............... | C08G 59/184 523/404 |
| 5,278,257 A * | 1/1994 | Mulhaupt | ................. | C08L 9/00 525/454 |
| 6,000,438 A | 12/1999 | Ohrn | | |
| 6,015,865 A * | 1/2000 | Blank | .................... | C08G 59/10 525/524 |
| 6,723,821 B2 * | 4/2004 | Smith | .................. | C08G 18/643 528/111 |

(Continued)

FOREIGN PATENT DOCUMENTS

| | | |
|---|---|---|
| CN | 101545565 A | 9/2009 |
| DE | 10256550 A1 | 6/2004 |

(Continued)

OTHER PUBLICATIONS

Translation of the International Preliminary Report on Patentability for International Application No. PCT/EP2016/055095, dated Mar. 10, 2016, 6 pages.
International Search Report for International Application No. PCT/EP2016/055095, dated Mar. 10, 2016, 2 pages.
Exhibit A—Dudley J. Primeaux, "Spray Polyurea Elastomers Offer Performance Advantages" Modern Paint and Coatings Jun. 1991, 54 pages.

(Continued)

*Primary Examiner* — Michael L Leonard
(74) *Attorney, Agent, or Firm* — Armstrong Teasdale LLP

(57) ABSTRACT

The present invention relates to a process for preparing a polyurethane, comprising the reaction of a composition (Z1) at least comprising a compound (P1) reactive toward isocyanates, and a composition (Z2) at least comprising a polyisocyanate, wherein compound (P1) is obtained by the reaction of at least one polyepoxide with a compound (V1) selected from the group consisting of polyetheramines and polyetherols. The present invention further relates to polyurethanes obtained by such a process, and to the use of a polyurethane of the invention for coating of pipelines, as a "field joint" or of subsea equipment, for example "christmas trees", for the offshore sector, and as a glass-syntactic polyurethane.

16 Claims, No Drawings

(56) References Cited

U.S. PATENT DOCUMENTS

| | | | |
|---|---|---|---|
| 9,695,139 B2 | 7/2017 | Karl et al. | |
| 2007/0240781 A1* | 10/2007 | Huntemann | C08G 18/6666 138/146 |
| 2009/0294057 A1* | 12/2009 | Liang | C09J 151/04 156/330 |
| 2013/0291992 A1* | 11/2013 | Wilmot | C08G 59/18 138/145 |
| 2016/0090436 A1 | 3/2016 | Prissok et al. | |
| 2016/0159999 A1 | 6/2016 | Prissok et al. | |
| 2016/0185086 A1 | 6/2016 | Chien et al. | |
| 2016/0194436 A1 | 7/2016 | Karl et al. | |
| 2017/0037223 A1 | 2/2017 | Charrak et al. | |
| 2017/0198085 A1* | 7/2017 | Yamada | C08G 18/58 |

FOREIGN PATENT DOCUMENTS

| | | |
|---|---|---|
| EP | 0510265 A1 | 10/1992 |
| WO | 9903922 A1 | 1/1999 |
| WO | 0216733 A1 | 2/2002 |
| WO | 2004003424 A1 | 1/2004 |
| WO | 2005056629 A1 | 6/2005 |
| WO | 2007042411 A1 | 4/2007 |
| WO | 2010003788 A1 | 1/2010 |
| WO | 2011003529 A1 | 1/2011 |
| WO | 2011161047 A1 | 12/2011 |
| WO | 2012030339 A1 | 3/2012 |
| WO | 2015000724 A1 | 1/2015 |
| WO | 2015062960 A1 | 5/2015 |
| WO | 2016050398 A1 | 4/2016 |
| WO | 2016075007 A1 | 5/2016 |
| WO | 2016142452 A1 | 9/2016 |

OTHER PUBLICATIONS

Exhibit B—Douglas A. Wicks, Review Paper "Blocked Isocyanates III: Part A. Mechanisms and Chemistry" Progress in Organic Coating 36 (1999) 148-172.

Exhibit C—Sonnenschein, Polyurethanes: Science, Technology, Markets, and Trends. "Introduction the Polyurethane Chemistry", Chapter 3, 22 pages, Published in 2015 by John Wiley & Sons, Inc.

\* cited by examiner

METHOD FOR PRODUCING COMPACT POLYURETHANES WITH IMPROVED HYDROLYTIC STABILITY

CROSS-REFERENCE TO RELATED APPLICATIONS

This application is a U.S. National Phase Application of PCT/EP2016/055095, filed Mar. 10, 2016, which claims the benefit of priority to EP Application No. 15158590.8, filed Mar. 11, 2015, the contents of which are hereby expressly incorporated by reference in their entirety.

The present invention relates to a process for preparing a polyurethane, comprising the reaction of a composition (Z1) at least comprising a compound (P1) reactive toward isocyanates, and a composition (Z2) at least comprising a polyisocyanate, wherein compound (P1) is obtainable or has been obtained by the reaction of at least one polyepoxide with a compound (V1) selected from the group consisting of polyetheramines and polyetherols. The present invention further relates to polyurethanes obtainable or obtained by such a process, and to the use of a polyurethane of the invention for coating of pipelines, as a "field joint" or of subsea equipment, for example "christmas trees", for the offshore sector, and as a glass-syntactic polyurethane.

Polyurethanes find use in a wide variety of different fields. For these different fields, polyurethanes are tailored in terms of their properties, such that they afford optimal properties in terms of processing or application.

For example, polyurethanes are used for coatings of shaped bodies, including for the coating of pipelines.

In the production of mineral oil from the sea, mineral oil deposits are increasingly being produced from great depths. The mineral oil from such production sites has a temperature of greater than 100° C. (up to 150° C.). This oil is pumped by means of pipelines from the offshore production site to the mainland. In order to reduce the heat loss from the oil, and hence avoid the precipitation of waxes out of the oil in the event of a production stoppage, the pipeline should typically be provided with a coating of polyurethane.

As a result of the ever deeper wells and the resulting higher oil temperature, the pipeline coatings are subjected to ever higher thermal stress. This thermal stress under water requires improved hydrolysis stability of the coating.

WO 2005/056629 describes a process for producing a polyurethane filled with hollow glass beads, in order to reduce the heat loss from an oil pipeline. In WO 2005/056629, preference is given to using aromatic isocyanates. A disadvantage of such polyether polyurethanes based on aromatic isocyanates is that the urethane bond can likewise be hydrolyzed at relatively high temperatures.

In order to get round this disadvantage, for example, WO 2007/042411, WO 99/03922 and WO 2010/003788 disclose coatings based on polyisocyanurates. These have the advantage of better thermal stability. However, hydrolysis stability at high temperatures is only better to a limited degree compared to normal polyurethanes. Moreover, the systems have the disadvantage of reacting particularly quickly, such that filling of large volumes can be achieved only with difficulty. It is likewise the case that polyisocyanurates are relatively brittle because of the high degree of crosslinking resulting from the isocyanurate ring.

WO 2011/161047 discloses a process in which a polyol of relatively high functionality and high molecular weight is used in combination with an epoxy resin. The disadvantage of this process is that the polyols of relatively high functionality and high molecular weight have high viscosities and are difficult to prepare. Moreover, the materials described in WO 2011/161047 do not have adequate long-term hydrolysis stability at the required temperatures.

U.S. Pat. No. 4,647,624 discloses reactions of a polyetherol with a polyepoxide, wherein further feedstocks are used for preparation of a polymer polyol. The polymer polyols obtained are reacted in turn with isocyanates, and the preparation of polyurethane foams is also disclosed. According to example 2 of U.S. Pat. No. 4,647,624, an epoxy adduct is formed. However, calculations show that no reaction of the components can have taken place under the conditions specified in example 2 of U.S. Pat. No. 4,647,624; the reactants used are merely mixed.

WO 2012/030339 describes a method of avoiding the generally poor long-term hydrolysis stability of polyurethane elastomers. What is disclosed by WO 2012/030339 is an epoxide material having good mechanical properties, having a hydrolysis stability of 160° C. The raw materials or reaction products used for the preparation of such elastomeric epoxy resins are known to those skilled in the art and are described, for example, in EP 0 510 265. The disadvantages of the process disclosed in WO 2012/030339 are apparent to the person skilled in the art. The processing of these epoxide materials is found to be difficult, since these materials have to be processed and cured at relatively high temperatures. Since processing generally takes place in the field or on the high seas, this is difficult to accomplish. Moreover, the materials have long demolding times, which is found to be not very economically viable on application.

One object underlying the present invention was that of providing materials having improved hydrolysis stability at high temperatures. A further object underlying the present invention was that of providing materials having improved hydrolysis stability at high temperatures and simultaneously satisfying the high mechanical demands in the oil and gas industry. A further object underlying the invention was that of providing coatings composed of these materials.

This object is achieved in accordance with the invention by a process for preparing a polyurethane, comprising the reaction of at least the following components:
   (i) composition (Z1) at least comprising a compound (P1) reactive toward isocyanates, and
   (ii) composition (Z2) at least comprising a polyisocyanate,
wherein compound (P1) is obtainable or has been obtained by the reaction of at least one polyepoxide with a compound (V1) selected from the group consisting of polyetheramines and polyetherols.

The process of the invention comprises the reaction of at least a composition (Z1) and a composition (Z2). Composition (Z1) comprises at least one compound (P1) reactive toward isocyanates, obtainable or obtained by the reaction of at least one polyepoxide with a compound (V1) selected from the group consisting of polyetheramines and polyetherols. Composition (Z2) comprises at least one polyisocyanate.

According to the invention, it is also possible to use further components, for example further compounds reactive toward isocyanates, for example polyols, chain extenders or additives. In a further embodiment, the present invention therefore relates to a process for preparing a polyurethane as described above, wherein at least one of the following components is used in the reaction in addition to components (i) and (ii):
   (iii) a further compound reactive toward isocyanates,
   (iv) a chain extender,
   (v) further additives.

In the process of the invention, a compound (P1) reactive toward isocyanates is used, which is obtainable or obtained by the reaction of at least one polyepoxide with a compound (V1) selected from the group consisting of polyetheramines and polyetherols. Compound (P1) is thus obtainable or obtained by the reaction of at least one polyepoxide with a polyetheramine or by the reaction of at least one polyepoxide with a polyetherol. According to the invention, compound (P1) is obtained as the reaction product of at least one polyepoxide with a polyetheramine or as the reaction product of at least one polyepoxide with a polyetherol. According to the invention, it is possible that compound (P1) is isolated before it is used in composition (Z1).

It has been found that, surprisingly, the use of a reaction product based on a polyetheramine or polyetherol with a polyepoxide as polyol component in the polyurethane formulation can achieve similar hydrolysis stabilities to pure epoxy elastomers disclosed in WO 2012/030339, but the processing advantages of polyurethane can still be utilized.

The reaction products of polyetheramine or polyetherol and polyepoxides preferably have a theoretically calculated OH number of 0.5 mg KOH/g to 75 mg KOH/g, calculated by the following formula:

$$OH = \frac{\frac{M_A}{EW} \cdot 56100 \frac{mg\ KOH}{eq}}{(M_A + M_B)}$$

with:
OH: theoretically calculated OH number of the reaction product of the invention in mg KOH/g
$M_A$: mass of polyetheramine, polyol or mixtures used in g
$M_B$: mass of epoxy resin or epoxide mixture used in g
EW: amino equivalent weight or OH equivalent weight of the polyetheramine or polyol or polyetheramine mixture or polyol mixture used in g/eq More preferably, the reaction products of the invention have a theoretically calculated OH number of 5 mg KOH/g to 65 mg KOH/g, more preferably of 10 mg KOH/g to 55 mg KOH/g and most preferably of 15 mg KOH/g to 50 mg KOH/g.

This calculation and definition does not take account of any OH groups present in the epoxy resin.

In a further embodiment, the present invention relates to a process for preparing a polyurethane as described above, wherein compound (P1) has a theoretically calculated OH number in the range from 0.5 mg KOH/g to 75 mg KOH/g.

The reaction products (P1) of the invention have an epoxy equivalent weight in the range from 180 to 5000 g/eq, calculated by the following formula:

$$EEWP = \frac{(M_A + M_B)}{\left(\frac{M_B}{EEW} - \frac{M_A}{EW}\right)}$$

EEWP: theoretically calculated epoxy equivalent weight of the reaction product of the invention g/eq
$M_A$: mass of polyetheramine, polyol or mixtures used in g
$M_B$: mass of epoxy resin or epoxide mixture used in g
EW: amino equivalent weight or OH equivalent weight of the polyetheramine, polyol or mixtures used in g/eq
EEW: epoxy equivalent weight of the epoxy resin or epoxide mixture used in g/eq In a further embodiment, the present invention accordingly relates to a process for preparing a polyurethane as described above, wherein compound (P1) has a theoretically calculated epoxy equivalent weight in the range from 180 to 5000 g/eq.

As explained, the compound (P1) of the invention is obtainable by the reaction of at least one polyepoxide with a polyetheramine or by the reaction of at least one polyepoxide with a polyetherol.

According to the invention, the ratio of the NH or OH groups to epoxy groups is preferably in the range from 1:1.5 to 1:75, more preferably in the range from 1:2 to 1:50, especially preferably in the range from 1:2.5 to 1:25 and most preferably in the range from 1:3 to 1:15.

Suitable polyepoxides, polyetheramines and polyetherols are known per se to those skilled in the art. The preparation of the reaction products of polyetheramines or polyetherols with polyepoxides can proceed as known to those skilled in the art. This involves mixing polyepoxide or polyepoxide mixtures with a polyetheramine, polyol or mixtures of polyetheramines and/or polyols, and optionally adding a catalyst. The reaction can be effected with use of polyetheramines at room temperature and without catalyst. In the case of use of polyetherols, an appropriate catalyst is required for the reaction. The reaction is preferably conducted at 50° C. to 180° C., more preferably between 80° C. to 150° C. and most preferably between 90° C. and 130° C.

The polyepoxides used in the context of the present invention may be any desired compounds. These polyepoxides comprise an average of more than one epoxy group, preferably two or more epoxy groups. Suitable polyepoxides are known to those skilled in the art from the literature, for example Handbook of Epoxy Resins (H. Lee, K. Neville, McGraw-Hill Book Company).

In the context of the present invention, the epoxide compounds used may either be saturated or unsaturated and aliphatic, cycloaliphatic, aromatic or heterocyclic, and may also have hydroxyl groups. They may additionally comprise substituents that do not cause any troublesome side reactions under the mixing and reaction conditions, for example alkyl or aryl substituents, ether moieties and the like. Preferably, these epoxide compounds are polyglycidyl ethers based on polyhydric, preferably dihydric, alcohols, phenols, hydrogenation products of these phenols and/or of novolaks (reaction products of mono- or polyhydric phenols with aldehydes, especially formaldehyde, in the presence of acidic catalysts). The epoxy equivalent weights (EEW) of these epoxide compounds are preferably between 100 and 2000, especially between 170 and 250. The epoxy equivalent weight of a substance is defined as that amount of the substance (in grams) that comprises 1 mol of oxirane rings.

Useful polyhydric phenols preferably include the following compounds: resorcinol, hydroquinone, 2,2-bis(4-hydroxyphenyl)propane (bisphenol A), isomer mixtures of dihydroxydiphenylme-thane (bisphenol F), tetrabromobisphenol A, 4,4'-dihydroxy-diphenylcyclohexane, 4,4'-dihydroxy-3,3-dimethyldiphenylpropane, 4,4'-dihydroxydiphenyl, 4,4'-dihydroxybenzophenol, bis(4-hydroxyphenyl)-1,1-ethane, bis(4-hydroxyphenyl)-1,1-isobutane, bis(4-hydroxyphenyl)methane, bis(4-hydroxyphenyl) ether, bis(4-hydroxyphenyl) sulfone inter alia, and also the chlorination and bromination products of the aforementioned compounds; bisphenol A is very particularly preferred.

The polyglycidyl ethers of polyhydric alcohols are also suitable in the context of the present invention. Examples of such polyhydric alcohols include ethylene glycol, diethylene glycol, triethylene glycol, 1,2-propylene glycol, polyoxypropylene glycols (n=1-20), 1,3-propylene glycol, 1,4-butylene glycol, pentane-1,5-diol, hexane-1,6-diol, hexane-1,2,6-triol, glycerol, trimethylolpropane, pentaerythritol, isosorbide and bis(4-hydroxycyclohexyl)-2,2-propane. It is also possible to use polyglycidyl ethers of alkoxylated polyhydric alcohols.

Moreover, it is also possible to use polyglycidyl esters of polycarboxylic acids, obtained by the reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are diglycidyl adipate, diglycidyl phthalate and diglycidyl hexahydrophthalate.

Products of this kind are sold by various manufacturers on the Araldite©, D.E.R.©, Epilox© or Baxxores© trade names. Particular preference is given to bisphenol A epoxides and bisphenol F epoxides and derivatives thereof, especially glycidyl ethers, for example diglycidyl ether bisphenol A, and mixtures with the abovementioned aliphatic di- or triepoxides.

It is also possible in accordance with the invention to use mixtures of different polyepoxides, for example mixtures of two or three polyepoxides.

According to the invention, the polyepoxide can be used in pure form or in the form of a composition comprising the polyepoxide and at least one diluent. Suitable diluents known to those skilled in the art are, for example, unreactive solvents such as ethyl acetate, hydrocarbons, reactive diluents such as linear, low-viscosity di- or triepoxides, plasticizers such as phthalates or citric esters. In addition, diluents in the context of this invention shall also be understood to mean low-viscosity reactive diluents, for example monoglycidyl ethers or diglycidyl ethers based on short-chain di- or triols, for example butane-1,4-diol, hexane-1,6-diol, trimethylolpropane, cyclohexane-1,4-dimethanol or polyoxypropylene glycol.

Polyetheramines and processes for preparation thereof are also known per se to those skilled in the art. Preference is given to using polyetheramines having a molecular weight in the range from 500 to 30 000 g/mol. Materials of this kind are commercially available from various manufacturers. Examples include Jeffamine®-D 2000; Jeffamine®-D4000; Jeffamine®-T3000, Jeffamine®-T5000; Polyetheramine D 2000; Polyetheramine T 5000; Poly A 27-2000; Poly A 37-5000.

In a further embodiment, the present invention relates to a process for preparing a polyurethane as described above, wherein compound (V1) is a polyetheramine having a molecular weight in the range from 500 to 30 000 g/mol.

More preferably, the polyetheramines have a molecular weight in the range from 1000 to 15 000 g/mol, and most preferably a molecular weight in the range from 1500 to 10 000 g/mol.

As well as the molecular weight, it is also possible to utilize the amino equivalent weight (AEW), which is known to the person skilled in the art, as a description of the polyetheramines. This can be ascertained by means of titration or by calculation. The polyetheramines used preferably have an amino equivalent weight in the range from 80 to 7500 g/eq, more preferably in the range from 150 to 3750 g/eq, and most preferably an amino equivalent weight in the range from 250 to 2500 g/eq.

It is also possible in accordance with the invention to use at least one polyetherol.

The polyetherols preferably have a number-average molecular weight in the range from 500 to 30 000 g/mol, more preferably from greater than 500 g/mol to less than 12 000 g/mol and especially from 600 g/mol to 8000 g/mol.

As well as the molecular weight, it is also possible to utilize the OH number, which is known to the person skilled in the art, for the description of the polyetherols. This can be ascertained by means of titration or by calculation. The polyetherols used preferably have an OH number in the range from 5 to 650 mg KOH/g, more preferably in the range from 10 to 600 mg KOH/g and most preferably in the range from 15 to 500 mg KOH/g.

The molecular weight can be determined by gel permeation chromatography or by the determination of the OH number (or amino equivalent weight) of the polyol (or polyetheramine) and subsequent conversion by calculation. Corresponding methods are described in DIN 16945.

In a further embodiment, the present invention relates to a process for preparing a polyurethane as described above, wherein compound (V1) is a polyetherol having a molecular weight in the range from 500 to 30 000 g/mol.

Polyetherols are prepared by known processes, for example by anionic polymerization with alkali metal hydroxides or alkali metal alkoxides as catalysts and addition of at least one starter molecule comprising 2 to 8 reactive hydrogen atoms in bound form, or by cationic polymerization with Lewis acids such as antimony pentachloride or boron fluoride etherate, or by means of bases, for example potassium hydroxide, from one or more alkylene oxides having 2 to 4 carbon atoms in the alkylene radical. Suitable alkylene oxides are, for example, 1,3-propylene oxide, 1,2- or 2,3-butylene oxide and preferably ethylene oxide and 1,2-propylene oxide. In addition, it is possible to use tetrahydrofuran monomer. Moreover, catalysts used may also be mul-timetal cyanide compounds, called DMC catalysts. The alkylene oxides may be used individually, in alternating succession or as mixtures. Preference is given to using 1,2-propylene oxide and mixtures of 1,2-propylene oxide and ethylene oxide, where the ethylene oxide is used in amounts of 1% to 50%, and further preferably in the form of an ethylene oxide end block ("EO cap"), such that the resultant polyols have primary OH end groups to an extent of more than 70%.

In a particularly preferred embodiment, mixtures of starter molecules are used, such that the mean number of reactive hydrogen atoms in the starter molecules is between 2 and 6.

Useful starter molecules preferably include water or 2- to 8-hydric alcohols, such as ethylene glycol, propane-1,2- and -1,3-diol, diethylene glycol, dipropylene glycol, butane-1,4-diol, glycerol or trimethylolpropane, pentaerythritol, sugar alcohols such as sorbitol or sugars such as su-crose, aminic compounds, for example ethylenediamine, diethanolamine or toluenediamine, or mixtures of the starter molecules.

The particularly preferred polyether polyols, preferably polyoxypropylene-polyoxyethylene polyols or polyoxypropylene polyols, preferably have a functionality of 1.5 to 5.8, preferably a functionality of 1.7 to 5 and most preferably a functionality of 1.85 to 4.5, and number-average molecular weights of 1000 g/mol to 12 000 g/mol (or an OH number of 7 to 325 mg KOH/g), preferably of 1500 g/mol to 8000 g/mol (or an OH number of 12 to 190 mg KOH/g), especially of 2000 g/mol to 6000 g/mol (or an OH number of 17 to 125 mg/KOH).

Polyisocyanates used may be aliphatic, cycloaliphatic, araliphatic and/or aromatic diisocyanates. Individual examples include the following aromatic isocyanates:

tolylene 2,4-diisocyanate, mixtures of tolylene 2,4- and 2,6-diisocyanate, diphenylmethane 4,4'-, 2,4'- and/or 2,2'-diisocyanate (MDI), mixtures of diphenylmethane 2,4'- and 4,4'-diisocyanate, urethane-, carbodiimide- or uretonimine-modified liquid diphenylmethane 4,4'- and/or 2,4-diisocyanates, 4,4'-diisocyanatodiphenylethane, the mixtures of monomeric methane diphenyl diisocyanates and higher polycyclic homologs of methane diphenyl diisocyanate (polymer MDI), naphthylene 1,2- or 1,5-diisocyanate or prepolymers of these isocyanates and polyols or isocyanates and isocyanate-reactive components.

Aliphatic diisocyanates used are customary aliphatic and/or cycloaliphatic diisocyanates, for example tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methyl-2,4- and/or -2,6-cyclohexane diisocyanate, 4,4'-, 2,4'- and/or 2,2'-dicyclohexylmethane diisocyanate or prepolymers of these isocyanates.

Preference is given in accordance with the invention to using aromatic polyisocyanates or prepolymers of aromatic polyisocyanates. In a further embodiment, the present invention therefore relates to a process for preparing a polyurethane as described above, wherein the polyisocyanate is an aromatic polyisocyanate.

Polyisocyanate prepolymers are obtainable by reacting above-described polyisocyanates in excess, for example at temperatures of 30 to 150° C., preferably at temperatures of 50 to 120° C. and most preferably at about 80° C., with polyols to give the prepolymer. Preference is given to using, for preparation of the prepolymers of the invention, polyisocyanates and commercial polyols based on polyesters, for example proceeding from adipic acid, or polyethers, for example proceeding from ethylene oxide and/or propylene oxide. Particular preference is given to using polyetherols.

Polyols are known to those skilled in the art and are described, for example, in "Kunststoffhandbuch, Band 7, Polyurethane", [Plastics Handbook, Volume 7, Polyurethanes] Carl Hanser Verlag, 3$^{rd}$ edition 1993, chapter 3.1. The polyols used here are preferably the above-described polymeric compounds having hydrogen atoms reactive toward isocyanates. The polyols used are more preferably polyetherols.

Optionally, customary chain extenders or crosslinking agents are added to the polyols mentioned in the preparation of the isocyanate prepolymers. Substances of this kind are known in principle from the prior art. The chain extender used is more preferably butane-1,4-diol, dipropylene glycol and/or tripropylene glycol. Preference is given to choosing the ratio of organic polyisocyanates to polyols and chain extenders such that the isocyanate prepolymer has an NCO content of 2% to 33.5%, preferably 10% to 32%, further preferably of 12% to 30% and most preferably an NCO content of 15% to 28%.

In a particularly preferred embodiment of the invention, the isocyanate component or the isocyanate prepolymer has a proportion of carbodiimide-modified 4,4'-MDI of at least 2.5% by weight, preferably of at least 7.5% by weight and most preferably of at least 12.5% by weight and not more than 30% by weight. The proportion of carbodiimide-modified 4,4'-MDI is based here on the isocyanate used in the isocyanate component or in the isocyanate prepolymer.

In a further embodiment, the present invention relates to a process for preparing a polyurethane as described above, wherein the polyisocyanate has an NCO content of 2% to 33.5%.

According to the invention, the polyisocyanate can be used in pure form or in the form of a composition, for example an isocyanate prepolymer. In a further embodiment, a mixture comprising polyisocyanate and at least one solvent may be used. Suitable solvents are known to those skilled in the art.

According to the invention, it is also possible that, as well as the compound (P1), further compounds reactive toward isocyanates, for example further polyols, are used.

For example, it is possible to use further polyetherols or polyesterols. Suitable polyetherols are especially those mentioned above.

Suitable polyester polyols are known per se to those skilled in the art. Polyester polyols may be prepared, for example, from organic dicarboxylic acids having 2 to 12 carbon atoms, preferably aliphatic dicarboxylic acids having 4 to 6 carbon atoms, and polyhydric alcohols, preferably diols, having 2 to 12 carbon atoms, preferably 2 to 6 carbon atoms. Examples of useful dicarboxylic acids include: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in a mixture with one another. Rather than the free dicarboxylic acids, it is also possible to use the corresponding dicarboxylic acid derivatives, for example dicarboxylic esters of alcohols having 1 to 4 carbon atoms or dicarboxylic anhydrides. Preference is given to using dicarboxylic acid mixtures of succinic acid, glutaric acid and adipic acid in ratios of, for example, 20 to 35:35 to 50:20 to 32 parts by weight, and especially adipic acid. Examples of di- and polyhydric alcohols, especially diols, are: ethanediol, diethylene glycol, propane-1,2- or -1,3-diol, dipropylene glycol, butane-1,4-diol, pentane-1,5-diol, hexane-1,6-diol, decane-1,10-diol, glycerol and trimethylolpropane.

Preference is given to using ethanediol, diethylene glycol, butane-1,4-diol, pentane-1,5-diol and hexane-1,6-diol. It is also possible to use polyester polyols formed from lactones, e.g. ε-caprolactone, or hydroxycarboxylic acids, e.g. ω-hydroxycaproic acid.

The polyester polyols can be prepared by polycondensing the organic, for example aromatic and preferably aliphatic, polycarboxylic acids and/or derivatives and polyhydric alcohols in catalyst-free form or preferably in the presence of esterification catalysts, appropriately in an atmos-phere of inert gas, for example nitrogen, carbon monoxide, helium, argon inter alia, in the melt at temperatures of 150 to 250° C., preferably 180 to 220° C., optionally under reduced pressure, down to the desired acid number, which is preferably less than 10, more preferably less than 2. In a preferred embodiment, as esterification mixture is polycondensed at the abovementioned temperatures down to an acid number of 80 to 30, preferably 40 to 30, under standard pressure and then under a pressure of less than 500 mbar, preferably 50 to 150 mbar. Useful esterification catalysts include, for example, iron, cadmium, cobalt, lead, zinc, antimony, magnesium, titanium and tin catalysts in the form of metals, metal oxides or metal salts. However, the polycondensation can also be conducted in the liquid phase in the presence of diluents and/or en-training agents, for example benzene, toluene, xylene or chlorobenzene, for removal of the water of condensation by azeotropic distillation. For preparation of the polyester polyols, the organic polycarboxylic acids and/or derivatives and polyhydric alcohols are advantageously polycondensed in a molar ratio of 1:1 to 1.8, preferably 1:1.05 to 1.2.

The polyester polyols used preferably have a functionality of 2 to 4, especially of 2 to 3, and, for example, a number-average molecular weight of 480 to 3000 g/mol, preferably 1000 to 3000 g/mol.

Most preferably, in the context of the present invention, the only further polyol components used are polyetherols.

According to the invention, it is possible to use further components, for example chain extenders, crosslinking agents, auxiliaries and additions or additives, for example surface-active substances, dyes, pigments, oxidation stabilizers, UV stabilizers, water scavengers, catalysts, latent heat storage means and hollow microbeads, defoamers, hydrolysis stabilizers. Suitable auxiliaries and additives can be found, for example, in the Kunststoffhandbuch, volume VII, ed-ited by Vieweg and Höchtlen, Carl Hanser Verlag, Munich 1966 (p. 103-113).

Chain extenders and/or crosslinking agents used are substances having a molecular weight of preferably less than 450 g/mol, more preferably of 60 to 400 g/mol, where chain extenders have two hydrogen atoms reactive toward isocyanates and crosslinking agents have 3 isocyanate-reactive hydrogen atoms. These may preferably be used individually or in the form of mixtures. Preference is given to using diols and/or triols having molecular weights of less than 400 g/mol, more preferably of 60 to 300 g/mol and especially 60 to 150 g/mol. Useful examples include aliphatic, cycloaliphatic and/or araliphatic diols having 2 to 14 and preferably 2 to 10 carbon atoms, such as ethylene glycol, propane-1,3-diol, decane-1,10-diol, 1,2-, 1,3-, 1,4-dihydroxycyclohexane, diethylene glycol, dipropylene glycol and butane-1,4-diol, hexane-1,6-diol and bis(2-hydroxyethyl)hydroquinone, triols such as 1,2,4-, 1,3,5-trihydroxycyclohexane, glycerol and trimethylolpropane, and low molecular weight polyalkylene oxides that contain hydroxyl groups and are based on ethylene oxide and/or 1,2-propylene oxide and the aforementioned diols and/or triols as starter molecules. In addition, chain extenders used may also be aromatic amines, for example diethyltoluenediamine, 3,3'-dichloro-4,4'-diaminodiphenylmethane, 3,5-diamino-4-chlorisobutyl benzoate, 4-methyl-2,6-bis(methylthio)-1,3-diaminobenzene, trimethylene glycol di-p-aminobenzoate. Aromatic aminic chain extenders of this kind are purchasable from various manufacturers and are usually also known to the person skilled in the art by various abbreviations, for example MOCA, MBOCA, MCDEA, DETA. The chain extenders used are more preferably monoethylene glycol, butane-1,4-diol, diethylene glycol, glycerol, trimethylolpropane or mixtures thereof.

According to the invention, the process is conducted such that, in the case of use of aminic chain extenders, there is reaction of the chain extender predominantly with isocyanate and only a minor degree of reaction, if any at all, of the chain extender with the compound (P1). Processes of this kind are known to those skilled in the art; for example, the metered addition of the aminic chain extender can be postponed until the mixing chamber. Processes of this kind are of course also possible with other chain extenders.

In a preferred embodiment of the invention, the proportion of chain extender in the composition (Z1) is in the range of 0% and 35% by weight, preferably in the range of 5% and 30% by weight and most preferably in the range of 7.5% and 25% by weight.

It is optionally possible to add auxiliaries and additives. Examples of these include surface-active substances, dyes, pigments, hydrolysis stabilizers, oxidation stabilizers, UV stabilizers, water scavengers, catalysts, latent heat storage means and hollow microbeads.

If hollow microbeads are used as additives, the resulting polyurethane is also referred to as glass-syntactic polyurethane.

Catalysts used for production of the shaped polyurethane bodies are preferably compounds which greatly accelerate the reaction of the compounds of component Z1 that comprise hydroxyl groups with the organic, optionally modified polyisocyanates (Z2). Examples of these include amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyl diaminoethyl ether, bis(dimethylaminopropyl)urea, dimethylpiperazine, 1,2-dimethylimidazole, 1-azabicyclo[3.3.0]-octane and preferably 1,4-diazabicyclo[2.2.2]octane, and alkanolamine compounds such as triethanolamine, triisopropanolamine, N-methyl- and N-ethyldiethanolamine and dimethylethanolamine.

Organic metal compounds are likewise useful. Preference is given to using organic metal compounds based on tin, zinc, bismuth, titanium, zirconium, manganese, iron, cobalt, copper, aluminum. Examples include organic tin compounds, such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates such as bismuth(III) neodecanoate, bismuth 2-ethylhexanoate and bismuth octoate, titanium compounds, for example (triethanolaminato)titanium(IV) isopropoxide or bis(triethanolaminato)titanium(IV) diisopropoxide or mixtures of various metal compounds. The organic metal compounds can be used alone or in combination with strongly basic amines. Preference is given to using exclusively organic metal compounds as catalysts for the reaction of Z1 and Z2.

In a preferred embodiment of the invention, the proportion of catalysts in composition (Z1) is in the range from 0.00001% by weight to 5% by weight, preferably in the range from 0.0001% by weight to 2% by weight and most preferably in the range of 0.0005% by weight and 1% by weight.

In the context of this invention, the term "hollow microbeads" is understood to mean organic and mineral hollow beads. Organic hollow beads used may, for example, be hollow plastic beads, for example of polyethylene, polypropylene, polyurethane, polystyrene or a mixture thereof. The mineral hollow beads may comprise, for example, clay, aluminosilicate, glass or mixtures thereof.

The hollow beads may have a vacuum or partial vacuum within or be filled with air, inert gases, for example nitrogen, helium or argon, or reactive gases, for example oxygen.

Typically, the organic or mineral hollow beads have a diameter of 1 to 1000 μm, preferably of 5 to 200 μm. Typically, the organic or mineral hollow beads have a bulk density of 0.1 to 0.5 g/cm$^3$. They generally have a thermal conductivity of 0.03 to 0.12 W/mK.

The hollow microbeads used are preferably hollow glass microbeads. In a particularly preferred embodiment, the hollow glass microbeads have a hydrostatic compressive strength of at least 20 bar. For example, the hollow glass microbeads used may be 3M—Scotchlite® Glass Bubbles.

Latent heat storage means used may be encapsulated and nonencapsulated lipophilic substances having a solid/liquid transition above 20° C., usually waxes. These may be encapsulated in a polymer. In the course of crude oil production, the latent heat storage means absorb heat from the warm crude oil and melt. In the event of a brief production stoppage, the insulation layer cools down gradually from the outside, in which case the lipophilic filling of the latent heat storage means also cools down, solidifies and in so doing releases the heat absorbed back to the crude oil. Similar solutions are described in DE 10256550, WO 2004/003424, U.S. Pat. No. 6,000,438, WO 2002/016733 or CN 101545565.

It is also possible to add blowing agents known as auxiliaries and additives from the prior art, for example water, pentane, cyclopentane etc. However, it is preferable that no blowing agent is used, especially that no water is added.

In addition, it is especially preferable when the residual water content of the reactants is reduced by addition of water scavengers. Examples of suitable water scavengers include zeolites. The water scavengers are used, for example, in an amount of 0.1% to 10% by weight, based on the total weight of the polyol component.

The polyurethane reaction mixture of the invention is produced by reacting composition (Z1) and composition (Z2) in such amounts that the equivalents ratio of NCO groups of the isocyanate groups to the sum total of the reactive hydrogen atoms is within a particular range. The person skilled in the art uses the expression "index". This reflects the molar ratio of the NCO groups to the reactive hydrogen atoms. An index of 100 corresponds here to a ratio of 1:1. In the case of an index of greater than 100, there is a molar excess of isocyanates; in the case of an index of less than 100, there is an excess of reactive hydrogen atoms. The index is preferably between 50 and 2500, more preferably between 60 and 350, even more preferably between 85 and 130 and especially between 90 and 115.

According to the above definition, the epoxy groups present in compound (V1) of the invention are not included in the calculation of the index.

The starting components are typically mixed and reacted at a temperature of 5° C. to 120° C., preferably 10° C. to 80° C., further preferably 20° C. to 60° C.

In a further aspect, the present invention also relates to the use of a compound (P1) obtainable or obtained by the reaction of at least one polyepoxide with a compound (V1) selected from the group consisting of polyetheramines and polyetherols for preparation of polyurethanes.

As explained, the process of the invention affords polyurethanes having particularly good hydrolysis stability, especially good hydrolysis stability at high temperatures.

In a further embodiment, the present invention relates to a polyurethane as described above, wherein the polyurethane is a cast elastomer. These may find use in a wide variety of technical fields, for example as mining screens, wheels and rollers, roll coatings etc.

In a further aspect, the present invention relates to a polyurethane obtainable or obtained by a process for preparing a polyurethane as described above.

In a further embodiment, the present invention relates to a polyurethane as described above, wherein the polyurethane is a compact polyurethane.

The polyurethanes of the invention are especially suitable for coating of pipelines, field joints and for subsea equipment.

If, as described above, no blowing agents are used, what are obtained as the product of the invention are compact polyurethanes and not polyurethane foams. Suitable reaction conditions or preparation processes for preparation of the polyurethanes or the coatings are known per se to those skilled in the art.

The components can be mixed with the standard processing machines. In a preferred embodiment, the mixing is effected by means of low-pressure machines or high-pressure machines. It is possible here for the parts to be coated to be produced either via mold casting or by means of a rotational method. Preference is given, however, to using mold casting. This involves pouring the reaction mixture into a mold comprising the element to be coated, for example the pipe. After the polyurethane has been cured, the mold is removed. The material can be used directly. In a particular embodiment of the invention, the coated part is then subjected to a heat treatment.

In the rotary casting method, the reaction mixture is applied by pouring it onto the rotating element, for example the pipeline pipe. The reaction mixture is obtained here by means of conventional mixing apparatuses, for example a low-pressure mixing head. In a particular embodiment, discharge is through a slot die. The rate of advance of the mixing head or the pipe is generally adjusted such that the desired thickness of the polyurethane layer is achieved with constant expulsion. For this purpose, the reaction mixture may preferably comprise thixotropic additives, which prevents the reaction mixture from dripping off the rotating element.

Alternatively, coating can be effected indirectly. For this purpose, the reaction mixture of the components is poured into a mold and then demolded. The molding thus produced is then applied to the pipe element to be coated, for example by screw connection or adhesive bonding.

The thickness of the polyurethane layer is preferably 5 to 200 mm, more preferably 10 to 150 mm and especially 20 to 100 mm. It is optionally possible to apply one or more further layers, for example an insulating layer and/or an outer layer of a thermoplastic, to the polyurethane layer. Preferably, no further layers are applied to the polyurethane layer.

The polyurethane coating of the invention features excellent mechanical properties, such as elongation at break and tensile strength, and excellent hydrolysis stability.

An element to be coated, for example a conduit element, for example a pipe, may be an uncoated conduit element made from steel, but it is also possible to use conduit elements already having one or more layers of coating. Preferably, in the context of the present invention, the conduit element is coated directly with the polyurethane reaction mixture of the invention. Alternatively, the polyurethane reaction mixture of the invention can, for example, also be applied to a powder sprayed fusion-bonded epoxy or polypropylene-coated (or else polyethylene-coated) conduit element. The conduit element may optionally also already have been coated with a first polyurethane layer comprising latent heat storage means, for example. Subsequently, the polyurethane reaction mixture is cured to give a polyurethane layer, optionally with heat treatment, for example by irradiation or in a kiln.

Polyurethane-coated conduit elements in the context of the present invention shall be understood to mean not just conventional coated pipe coatings, but also polyurethane-coated weld regions of pipelines, called "field joints", and polyurethane-coated articles associated with pipelines, such as muffs, wellbore connections, "christmas trees", pipe collectors, pumps and buoys. Conduit elements shall also include polyurethane-coated cables, preferably offshore cables. Moreover, in the context of the present invention, a polyurethane-coated conduit element also includes pipes that have been ensheathed for reinforcement, such as bend stiffeners or bend restrictors, in which case the bend stiffeners and bend restrictors correspond to the polyurethane coating. Preferably, the polyurethane-coated conduit element of the invention is understood to mean a conduit element of an offshore pipeline or an offshore cable. "Offshore" means that these articles come into contact with seawater in customary use. More preferably, the polyurethane-coated conduit element of the invention is a polyurethane-coated pipe of an offshore pipeline, a field joint of an offshore pipeline or a "christmas tree" of an offshore pipeline, especially an offshore pipeline for production of crude oil.

As explained, the coating of the parts can be effected directly or indirectly, and in the case of indirect coating the polyurethane is prepared separately and then applied to the element to be coated, by means of screw connections, for example. Preferably, polyurethane is poured or sprayed directly onto the surface of the material to be coated. In general, the surfaces to be coated consist of metals, such as steel, iron, copper or aluminum, or of plastics, for example polypropylene or epoxy resins. For better adhesion, it is optionally possible to use customary adhesion promoters, such as internal adhesion promoters that are added to the polyurethane components, external adhesion promoters that are applied directly to the surface to be coated, and/or physical adhesion promoters. It is also possible to pretreat the surface to be coated, for example by flame treatment or plasma treatment.

Accordingly, the present invention also relates, in a further aspect, to the use of a polyurethane obtainable or obtained by a process for preparing a polyurethane as described above, or of a polyurethane as described above, for coating of pipelines, as a pipeline coating, field joint or christmas tree for the offshore sector.

In a further aspect, the present invention also relates to the use of a polyurethane obtainable or obtained by a process for preparing a polyurethane as described above, or of a polyurethane as described above, as glass-syntactic polyurethane.

Further embodiments of the present invention can be inferred from the claims and examples. It will be apparent that the features of the subject matter/process/uses of the invention that are mentioned above and elucidated hereinafter are usable not just in the particular combination specified but also in other combinations without leaving the scope of the invention. For example, the combination of a preferred feature with a particularly preferred feature, or of a feature which is not characterized any further with a particularly preferred feature, etc., is also implicitly embraced even if this combination is not explicitly mentioned.

Adduced hereinafter are illustrative embodiments of the present invention, but these do not restrict the present invention. More particularly, the present invention also embraces those embodiments that arise from the dependency references and hence combinations cited hereinafter.

1. A process for preparing a polyurethane, comprising the reaction of at least the following components:
   (i) composition (Z1) at least comprising a compound (P1) reactive toward isocyanates, and
   (ii) composition (Z2) at least comprising a polyisocyanate,
   wherein compound (P1) is obtainable or has been obtained by the reaction of at least one polyepoxide with a compound (V1) selected from the group consisting of polyetheramines and polyetherols.

2. The process for preparing a polyurethane according to embodiment 1, wherein at least one of the following components is used in the reaction in addition to components (i) and (ii):
   (iii) a further compound reactive toward isocyanates,
   (iv) a chain extender,
   (v) further additives.

3. The process for preparing a polyurethane according to embodiment 1 or 2, wherein compound (P1) has a theoretically calculated OH number in the range from 0.5 mg KOH/g to 75 mg KOH/g.

4. The process for preparing a polyurethane according to any of embodiments 1 to 3, wherein compound (P1) has a theoretically calculated epoxy equivalent weight in the range from 180 to 5000 g/eq.

5. The process for preparing a polyurethane according to any of embodiments 1 to 4, wherein compound (V1) is a polyetheramine having a molecular weight in the range from 500 to 30 000 g/mol.

6. The process for preparing a polyurethane according to any of embodiments 1 to 5, wherein compound (V1) is a polyetherol having a molecular weight in the range from 500 to 30 000 g/mol.

7. The process for preparing a polyurethane according to any of embodiments 1 to 6, wherein the polyisocyanate is an aromatic polyisocyanate.

8. The process for preparing a polyurethane according to any of embodiments 1 to 7, wherein the polyisocyanate has an NCO content of 2% to 33.5%.

9. The process for preparing a polyurethane according to any of claims 1 to 8, wherein a catalyst is used.

10. The process for preparing a polyurethane according to any of claims 1 to 9, wherein the proportion of catalysts in composition (Z1) is in the range from 0.00001% by weight to 5% by weight.

11. A polyurethane obtainable or obtained by a process according to any of claims 1 to 10.

12. The polyurethane according to claim 11, wherein the polyurethane is a compact polyurethane.

13. The polyurethane according to claim 11 or 12, wherein the polyurethane is a cast elastomer.

14. The use of a compound (P1) obtainable or obtained by the reaction of at least one polyepoxide with a compound (V1) selected from the group consisting of polyetheramines and polyetherols for preparation of polyurethanes.

15. The use of a polyurethane obtainable or obtained by a process according to any of claims 1 to 10, or of a polyurethane according to any of claims 11 to 13, for coating of pipelines, as a field joint or for subsea equipment for the offshore sector.

16. The use of a polyurethane obtainable or obtained by a process according to any of claims 1 to 10, or of a polyurethane according to any of claims 11 to 13, as a glass-syntactic polyurethane.

17. The use of a polyurethane obtainable or obtained by a process according to any of claims 1 to 10, or of a polyurethane according to any of claims 11 to 13, in technical or industrial applications.

The invention is to be elucidated in detail hereinafter by examples, without restricting the subject matter of the invention.

EXAMPLES

1. Feedstocks

Poly 1: Jeffamine® T-403 polyetheramine having a molecular weight of about 440 g/mol, an AHEW of 81 g/eq from Huntsman Poly 2: Jeffamine® T-3000 polyetheramine having a molecular weight of about 3000 g/mol and an AHEW of 530 g/eq from Huntsman Poly 3: Jeffamine® T-5000 polyetheramine having a molecular weight of about 5000 g/mol and an AHEW of 952 g/eq from Huntsman Poly 4: Polyetheramine D-2000 from BASF having a molecular weight of about 2000 g/mol and an AHEW of 500 g/eq from Huntsman Poly 5: Jeffamine® D-4000 polyetheramine having a molecular weight of about 4000 g/mol and an AHEW of 1000 g/eq from Huntsman Poly 6: Lupranol 2090 from BASF Polyurethanes GmbH, a trifunctional polyol having an OH number of 28 mg KOH/g Poly 7: polyetherol based on sorbitol, propylene oxide and ethylene oxide, having an ethylene oxide content of 10% by weight and an OH number of 43 mg KOH/g Poly 8: Lupranol 1005/1 from BASF Polyurethanes GmbH; polypropylene glycol having a mean molecular weight of 4000 g/mol and an OH number of 28 mg KOH/g Poly 9: polyetherol based on trimethylolpropane and propylene oxide, having an OH number of 860 mg KOH/g Poly 10: Lupranol 1200 from BASF Polyurethanes GmbH, polypropylene glycol having a mean molecular weight of 450 g/mol and an OH number of 248 mg KOH/g Poly 11: Lupranol 2010/1 from BASF Polyurethanes GmbH, having an OH number of 45 mg KOH/g Epoxide 1: EPON™ Resin 828 from Momentive, a difunctional epoxy resin based on bisphenol) A and epichlorohydrin, having an EEW of 185 g/eq Epoxide 2: Araldite® GY 250 from Huntsman, an epoxy resin based on bisphenol A and epichlorohydrin, having an EEW of 185 g/eq Epoxide 3: Epilox® 13-21 from Leuna Harze, an epoxide reactive diluent based on butane-1,4-diol and epichlorohydrin, having an EEW of 132 g/eq Epoxide 4: Epilox® 13-31 from Leuna Harze, an epoxide reactive diluent based on trimethylolpropane and epichlorohydrin and an EEW of 136 g/eq Epoxide 5: Epilox® M 985 from Leuna Harze, a diglycidyl ether based on polyoxypropylene, having an EEW of 460 g/eq Epoxide 6: IPOX® RD 19 from ipox chemicals, polyoxypropylene diglycidyl ether having an EEW of 315 g/eq Epoxide 7: IPOX® RD 21 from ipox chemicals, poly(tetramethylene oxide) diglycidyl ether having an EEW of 420 g/eq Epoxide 8: Epilox® A 19-03 from Leuna-Harze having an epoxy equivalent weight of 190 g/eq DL: propylene carbonate DF: defoamer ZP: 50% zeolite paste in polyol having an OH number of 80 mg KOH/g KV1: butane-1,4-diol AV1: 2-amino-1-propanol sourced via Aldrich Kat 1: Lupragen N 201 from BASF Polyurethanes GmbH Kat 2: Fomrez UL 28 from Momentive Kat 3: 2,4,6-tris(dimethylaminomethyl)phenol sourced via Aldrich Kat 4: K-Kat XK 604 from King Industries Kat 5: Anchor® 1040 from Air-Products Kat 6: Tyzor® TE from Dorf Ketal ISO 1: Lupranat MP 102 from BASF Polyurethanes GmbH, having an NCO content of 23%

ISO 2: Lupranat M 20 from BASF Polyurethanes GmbH, having an NCO content of 31.5%

ISO 3: Lupranat MM 103 from BASF Polyurethanes GmbH, a carbodiimide-modified diphenylmethane 4,4'-diisocyanate having an NCO content of 29.5%

ISO 4: ISO 134/7 from Polyurethanes GmbH having an NCO content of 26.2%

ISO 5: mixture of 30% ISO 1 and 70% ISO 2, having an NCO content of 28.9%

ISO 6: mixture of 50% ISO 1 and 50% ISO 3, having an NCO content of 26.2%

ISO 7: mixture of 70% ISO 1 and 30% ISO 2, having an NCO content of 25.5%

2. General Method for Preparation of the Reaction Products from Polyetheramines and Polyepoxides For the preparation of the reaction products from polyetheramines and polyepoxides, a 4-neck flask having a stirrer, nitrogen inlet and condenser is initially charged with the appropriate amount of epoxy resin or epoxide mixture, and then the appropriate amount of polyetheramine or polyetheramine mixtures is fed in. The reaction mixture is heated up gradually to a temperature of 125° C. and kept at this temperature for a period of at least 3 h. Thereafter, the material is cooled down to about 60° C.-80° C. and decanted. Tables 1a and 1b list some examples of reaction products of the invention.

TABLE 1a

| | B1 | B2 | B3 | B4 | B5 | B6 | B7 | B8 |
|---|---|---|---|---|---|---|---|---|
| Momentive Resin 828 | 88.1 | 78.7 | 78.7 | 64.9 | 64.9 | 48.1 | 52.6 | 35.7 |
| Polyetheramine D 2000 | 11.9 | | 21.3 | | 35.1 | | 47.4 | |
| Jeffamine D-4000 | | 21.3 | | 35.1 | | 51.9 | | 64.3 |
| EEWP (calculated) | 221 | 247 | 261 | 317 | 356 | 481 | 528 | 777 |
| OH number (calculated) | 13.4 | 11.9 | 23.9 | 19.7 | 39.4 | 29.1 | 53.2 | 36.1 |
| Viscosity at 50° C. [Pas] | 1.82 | 1.89 | 3.21 | 2.90 | 8.36 | 5.36 | 34.9 | 13.21 |

TABLE 1b

|  | B9 | B10 | B11 | B12 | B13 | B14 | B15 | B16 |
|---|---|---|---|---|---|---|---|---|
| Araldite GY 250 | 64.36 | 48.68 | 63.02 | 91.77 | 47.46 |  |  |  |
| Epoxide 3 |  |  |  |  |  | 35.92 |  |  |
| Epoxide 4 |  |  |  |  |  |  | 41.68 |  |
| Epoxide 7 |  |  |  |  |  |  |  | 78.95 |
| Polyetheramine D 2000 | 35.64 |  |  |  |  |  |  |  |
| Jeffamine D-4000 |  |  |  |  | 52.54 |  |  |  |
| Jeffamine T-5000 |  | 51.32 |  |  |  | 64.08 | 58.32 | 21.05 |
| Jeffamine T-3000 |  |  | 36.98 |  |  |  |  |  |
| Jeffamine T-403 |  |  |  | 8.23 |  |  |  |  |
| EEWP (calculated) | 359 | 478 | 369 | 253 | 490 | 488 | 408 | 603 |
| OH number (calculated) | 39 | 30 | 39 | 57 | 29 | 38 | 34 | 12 |

3. Stability Experiments in Moist Storage

The use of epoxides of bisphenol A and epichlorohydrin for offshore applications is explicitly described in WO 2011/161047 and WO 2011/003529 as an optional addition. However, it is only possible to use small amounts of epoxy resins in these systems, since the epoxy resin is not incorporated into matrix. Moreover, the high use of epoxy resins leads to a reduction in expansion under storage in water or water vapor and at high temperatures. A normal polyurethane elastomer is not very stable under moist and warm conditions at elevated temperatures. This is to be illustrated by the examples which follow.

For this purpose, the constituents of the polyol component (polyols, chain extender, zeolite paste, defoamer, inventive reaction products of polyetheramines or polyols and polyepoxides etc.) were first mixed by means of a Speedmixer™ from Hauschild at 800 rpm for 20 sec and at 2000 rpm for 40 sec, and subsequently degassed under reduced pressure. Then the appropriate amount of degassed isocyanate component was added to the mixture, which was mixed in the Speedmixer™ at 2000 rpm for 40 sec. The reactive mixture was then introduced into a mold heated to 70° C. in order to produce test plaques having a thickness of 2 mm. After 2 hours at 70° C., the test plaques were demolded and, after they had been stored under standard climatic conditions for 7 days, tensile specimens were die-cut out of these test plaques, and the tensile strength and elongation were determined according to DIN 53504. A further portion of these tensile specimens was then stored at 130° C. in water vapor for 5, 10 or 15 hours, and then the tensile strength and elongation were determined according to DIN 53504.

Table 2 below shows the composition of the formulations and the results tests.

TABLE 2

|  | V1 | V2 | B17 | B18 | B19 | V3 |
|---|---|---|---|---|---|---|
| Poly 6 | 85.32 |  |  |  |  |  |
| Epoxide 1 |  | 80.498 |  |  |  | 86.500 |
| Material from B 9 |  |  | 80.498 | 86.500 |  |  |
| Material from B 10 |  |  |  |  | 86.500 |  |
| KV | 13.00 | 17.000 | 17.000 | 11.000 | 11.000 | 11.000 |
| ZP | 1.50 | 2.000 | 2.000 | 2.500 | 2.500 | 2.500 |
| DL |  | 5.000 | 5.000 |  |  |  |
| DF |  | 0.500 | 0.500 |  |  |  |
| Kat1 | 0.18 |  |  |  |  |  |
| Kat2 |  | 0.002 | 0.002 | 0.0005 | 0.0005 | 0.0005 |
| ISO 4 | X |  |  | X | X | X |
| ISO 5 |  | X | X |  |  |  |
| Index | 103 | 103 | 103 | 103 | 103 | 103 |
| 0 h 130° C./water vapor |  |  |  |  |  |  |
| Tensile strength [MPa] | 16 | 20 | 28 | 21 | 18 | n.m. |
| Elongation [%] | 490 | 90 | 80 | 140 | 120 | n.m. |
| 5 h 130° C./water vapor |  |  |  |  |  |  |
| Tensile strength [MPa] | 10 | 52 | 33 | 28 | 22 | n.m. |
| Elongation [%] | 390 | 5 | 50 | 150 | 130 | n.m. |
| 10 h 130° C./water vapor |  |  |  |  |  |  |
| Tensile strength [MPa] | 6 | 24 | 36 | 28 | 22 | n.m. |
| Elongation [%] | 220 | 2 | 40 | 120 | 130 | n.m. |
| 15 h 130° C./water vapor |  |  |  |  |  |  |
| Tensile strength [MPa] | 4 | 23 | 37 | 27 | 25 | n.m. |
| Elongation [%] | 110 | 1 | 40 | 130 | 150 | n.m. | n.m. Measurement not possible since material is too soft and could not be demolded As apparent from the comparative examples and the examples, a normal polyurethane elastomer does not exhibit any particular strength under moist conditions and at high temperatures. The use of high concentrations of epoxides in example V2 shows that the materials lose elongation to a very significant degree. Moreover, it was not possible in example V3 to obtain a material utilizable for testing. The material from V3 was too soft and could not be demolded even after curing at 70° C. for 24 hours. This makes it clear that high concentrations of epoxy resins cannot be utilized directly in a polyurethane system. Inventive examples B17-B19 show that the materials have excellent properties under moist and warm conditions without lowering of extension below a critical level. Moreover, it becomes clear from the examples that the appropriate modification of isocyanate prepolymers allows the systems of the invention to be improved further, or materials that are not possible with the pure epoxy resins to be achieved.

4. Tests—Storage Under Moist Conditions

The systems disclosed in WO 2011/161047 that have a concentration of epoxy resins of 2% to 15% by weight, based on the polyol component, likewise show poor hydrolysis stability under prolonged storage in synthetic seawater (according to ASTM D1141-98 "Standard Practice for the Preparation of Substitute Ocean Water") at elevated temperatures. In order to get round the adverse effect of high concentrations of epoxy resins in the formulations, the person skilled in the art could propose using epoxy resins based on polyetherols and epichlorohydrin. However, these materials have adverse properties, which is to be illustrated in the examples which follow.

For this purpose, the constituents of the polyol component (polyols, chain extender, zeolite paste, defoamer, inventive reaction products of polyetheramines or polyols and epoxides etc.) were first mixed by means of a Speedmixer™ from Hauschild at 800 rpm for 20 sec and at 2000 rpm for 40 sec, and subsequently degassed under reduced pressure. Then the appropriate amount of degassed isocyanate component was added to the mixture, which was mixed in the Speedmixer™ at 2000 rpm for 40 sec. The reactive mixture was then introduced into a mold heated to 70° C. in order to produce test plaques having a thickness of 2 mm. After 2 hours at 70° C., the test plaques were demolded and, after they had been stored under standard climatic conditions for 7 days, tensile specimens were die-cut out of these test plaques, and the tensile strength and elongation were determined according to DIN 53504. A further portion of these tensile specimens was then stored in synthetic seawater in a pressure vessel at 120° C. and, at particular intervals, tensile specimens were removed, and tensile strength and elongation were determined in the freshly removed state. In addition, the tensile strength of the materials was likewise determined in the dried state. For this purpose, the tensile specimens, after being removed from the synthetic seawater, were dried at 40° C. for at least 16 hours and then conditioned under standard climatic conditions for a further 2 hours.

Tables 4a and 4b below give information about the results. The composition is apparent from tables 3a and 3b. As can be seen from experiments V6-V8, the high concentrations of epoxy resins based on polyetherols and epichlorohydrin show poor compatibility with the polyurethane system. The epoxy resin migrates out of the polyurethane during the 7-day storage period. In some cases, this effect was already found after demolding. Meanwhile, B23 shows that the use of the materials of the invention allows a large amount of these incompatible epoxides to be introduced into a polyurethane system. Experiments V4 and V5 show that the combinations of epoxy resins in polyol mixtures that are disclosed in the prior art do not lead to adequate hydrolysis stability at high temperatures. The inventive materials in B20 to 22 have very good hydrolysis stability at relatively high temperatures.

TABLE 3a

|  | V4 | V5 | V6 | V7 | V8 | V9 | V10 |
|---|---|---|---|---|---|---|---|
| Poly 6 |  |  |  |  |  |  | 82.498 |
| Poly 7 | 73.000 | 65.000 |  |  |  |  |  |
| Epoxide 2 | 15.000 | 15.000 |  |  |  | 82.498 |  |
| Epoxide 5 |  |  | 82.498 |  |  |  |  |
| Epoxide 6 |  |  |  | 82.498 |  |  |  |
| Epoxide 7 |  |  |  |  | 82.498 |  |  |
| Material from B 10 |  |  |  |  |  |  |  |
| Material from B 14 |  |  |  |  |  |  |  |
| Material from B 15 |  |  |  |  |  |  |  |
| Material from B 16 |  |  |  |  |  |  |  |
| KV | 10.000 | 18.000 | 15.000 | 15.000 | 15.000 | 15.000 | 15.000 |
| ZP | 1.500 | 1.500 | 2.500 | 2.500 | 2.500 | 2.500 | 2.500 |
| DL |  |  |  |  |  |  |  |
| DF | 0.500 | 0.500 |  |  |  |  |  |
| Kat1 |  |  |  |  |  |  |  |
| Kat2 | 0.005 | 0.005 | 0.002 | 0.002 | 0.002 | 0.002 | 0.002 |
| ISO 2 |  |  | X | X | X | X | X |
| ISO 6 | X | X |  |  |  |  |  |
| Index | 103 | 103 | 103 | 103 | 103 | 103 | 103 |

TABLE 3b

|  | B20 | B21 | B22 | B23 |
|---|---|---|---|---|
| Poly 6 |  |  |  |  |
| Poly 7 |  |  |  |  |
| Epoxide 2 |  |  |  |  |
| Epoxide 5 |  |  |  |  |
| Epoxide 6 |  |  |  |  |
| Epoxide 7 |  |  |  |  |
| Material from B 10 |  | 82.498 |  |  |
| Material from B 14 | 82.498 |  |  |  |
| Material from B 15 |  |  | 82.498 |  |
| Material from B 16 |  |  |  | 82.498 |
| KV | 15.000 | 15.000 | 15.000 | 15.000 |

TABLE 3b-continued

|  | B20 | B21 | B22 | B23 |
|---|---|---|---|---|
| ZP | 2.500 | 2.500 | 2.500 | 2.500 |
| DL |  |  |  |  |
| DF |  |  |  |  |
| Kat1 |  |  |  |  |
| Kat2 | 0.002 | 0.002 | 0.002 | 0.002 |
| ISO 2 | X | X | X | X |
| ISO 6 |  |  |  |  |
| Index | 103 | 103 | 103 | 103 |

TABLE 4a

|  | V4 | V5 | V6 | V7 | V8 | V9 | V10 |
|---|---|---|---|---|---|---|---|
| Comments | C | C | A | B | A | C | C |
| Mech. properties |  |  |  |  |  |  |  |
| Hardness [Shore A] | 85 | 94 | n.d. | 91 | n.d. | 97 | 90 |
| Hardness [Shore D] | n.d. | 49 | n.d. | 31 | n.d. | 59 | 38 |
| Tensile strength [MPa] | 12 | 23 | n.d. | 12 | n.d. | 22 | 13 |
| Elongation [%] | 170 | 170 | n.d. | 90 | n.d. | 90 | 80 |
| Hydrolysis for 7 days (120° C.) |  |  |  |  |  |  |  |
| Tensile strength [MPa] | 12 (n.d.) | 22 (n.d.) | n.d. | 4 (6) | n.d. | 48 (n.d.) | 4 (8) |
| Elongation [%] | 150 (n.d.) | 160 (n.d.) | n.d. | 120 (130) | n.d. | 3 (n.d.) | 170 (180) |
| Hydrolysis for 14 days (120° C.) |  |  |  |  |  |  |  |
| Tensile strength [MPa] | 9 (n.d.) | 18 (n.d.) | n.d. | 2 (3) | n.d. | n.d. | F |
| Elongation [%] | 170 (n.d.) | 170 (n.d.) | n.d. | 100 (120) | n.d. | n.d. | F |
| Hydrolysis for 28 days (120° C.) |  |  |  |  |  |  |  |
| Tensile strength [MPa] | 5 (n.d.) | 10 (n.d.) | n.d. | F | n.d. | n.d. | F |
| Elongation [%] | 150 (n.d.) | 100 (n.d.) | n.d. | F | n.d. | n.d. | F |
| Hydrolysis for 56 days (120° C.) |  |  |  |  |  |  |  |
| Tensile strength [MPa] | F | F | n.d. | F | n.d. | n.d. | F |
| Elongation [%] | F | F | n.d. | F | n.d. | n.d. | F |

TABLE 4b

|  | B20 | B21 | B22 | B23 |
|---|---|---|---|---|
| Comments | C | C | C | D |
| Mech. properties |  |  |  |  |
| Hardness [Shore A] | 94 | 96 | 94 | 87 |
| Hardness [Shore D] | 45 | 62 | 50 | n.d. |
| Tensile strength [MPa] | 15 | 26 | 20 | 9 |
| Elongation [%] | 70 | 60 | 60 | 80 |
| Hydrolysis for 7 days (120° C.) |  |  |  |  |
| Tensile strength [MPa] | 12 (19) | 26 (32) | 16 (27) | n.d. |
| Elongation [%] | 50 (30) | 40 (40) | 30 (20) | n.d. |
| Hydrolysis for 14 days (120° C.) |  |  |  |  |
| Tensile strength [MPa] | 9 (16) | 21 (27) | 13 (20) | n.d. |
| Elongation [%] | 70 (30) | 50 (40) | 30 (20) | n.d. |
| Hydrolysis for 28 days (120° C.) |  |  |  |  |
| Tensile strength [MPa] | 6 (13) | 16 (20) | 11 (22) | n.d. |
| Elongation [%] | 70 (40) | 50 (40) | 40 (20) | n.d. |
| Hydrolysis for 56 days (120° C.) |  |  |  |  |
| Tensile strength [MPa] | 4 (8) | 11 (15) | 9 (20) | n.d. |
| Elongation [%] | 100 (80) | 90 (70) | 30 (20) | n.d. |

Comments relating to table:

A: epoxy resin incompatible with PU system, significant resin migration (sweating) out of the test plaque, no determination of the mechanical properties possible B: epoxy resin compatibility with PU system not good, easy resin migration (sweating) out of the test plaque, determination of the mechanical properties possible C: homogeneous appearance, full mechanical testing possible D: homogeneous appearance, no migration of reaction product of IPOX RD 21 and Jeffamine T-5000 out of the PU material F: material destroyed by the hydrolysis - no measurement of mechanical properties possible ( ): the value in brackets describes the value of the mechanical property after drying at 40° C. for at least 16 hours n.d. property not determined

5. Processability of the Polyurethanes

Moreover, the materials of the invention have distinct advantages in terms of processing over elastomeric epoxide systems as described, for example, in WO 2012/030339. The materials described in WO 2012/030339 are processed at relatively high temperatures and likewise require high molding temperatures. Since materials for the oil & gas industry are often applied in the field (for example as a field joint), this is very difficult to achieve. Moreover, the materials have a long demolding time, which makes the systems relatively uneconomic. The advantages of the materials of the invention are to be elucidated further in the examples which follow.

The materials of the invention were produced as follows: the constituents of the polyol component (polyols, chain extender, zeolite paste, defoamer, inventive reaction products of polyetheramines or polyols and epoxides etc.) were first mixed by means of a Speedmixer™ from Hauschild at 800 rpm for 20 sec and at 2000 rpm for 40 sec, and subsequently degassed under reduced pressure. The polyol mixture of example B25 was then heated to a temperature of 50° C. In the case of example B24, operation was effected at room temperature. Then the appropriate amount of degassed isocyanate component was added to the mixture at a temperature of 25° C. (B24 and B25) and mixed in the Speedmixer™ at 2000 rpm for 40 sec. The material was then introduced into a mold of dimensions 5×5×1 cm that had been stored at room temperature and stored at room temperature. After 5 minutes at room temperature, a check was made every minute as to whether the material already had sufficient hardness determinable by means of a commercial Shore A meter. At the time at which Shore A hardness was measurable, the material was demolded and then the evolution of hardness over time was documented.

The production of the epoxide-based elastomers was produced analogously to the process described in WO 2012/030339. For this purpose, the epoxide prepolymers were heated to a temperature of 50° C. and degassed. Subsequently, the amine crosslinker and the 2,4,6-tris(dimethylaminomethyl)phenol catalyst were added in the appropriate amount and mixed by means of a Speedmixer from Hauschild at 800 rpm for 30 seconds and then at 2300 rpm for 60 seconds and poured into a mold of dimensions 5×5×1 cm that had been preheated to 100° C., and stored at 100° C. in a heating cabinet. After 10 minutes at 100° C., a check was made every minute as to whether the material already had sufficient hardness determinable by means of a commercial Shore A meter. At the time at which Shore A hardness was measurable, the material was demolded and then the evolution of hardness over time was documented.

Table 5 below gives information as to the composition of the systems and the evolution of hardness over time.

TABLE 5

|  | B24 | V11 | B25 | V12 |
| --- | --- | --- | --- | --- |
| Material from B 9 | 80.500 | 100 |  |  |
| Material from B 10 |  |  | 85.493 | 100 |
| KV | 17.000 |  | 12.000 |  |
| ZP | 2.000 |  | 2.000 |  |
| DL | 5.000 |  |  |  |
| DF | 0.500 |  | 0.500 |  |
| Kat2 | 0.002 |  |  |  |
| AV1 |  | 10.5 |  | 7.9 |
| Kat3 |  | 2.0 |  | 3.2 |
| Kat4 |  |  | 0.007 |  |
| ISO 6 |  |  |  | 100 |
| ISO 7 |  | 100 |  |  |
| Index | 103 | — | 103 | — |

| Time [min] | Hardness [Shore A] | | | |
| --- | --- | --- | --- | --- |
| 5 |  |  | 48 |  |
| 7 | 40 |  | 54 |  |
| 9 | 48 |  | 60 |  |
| 11 | 52 |  | 65 |  |
| 13 | 54 | 35 | 73 | 20 |
| 15 | 56 | 38 | 78 | 28 |
| 16 |  | 40 |  | 33 |
| 17 | 61 |  | 84 |  |
| 18 |  | 42 |  | 40 |
| 19 | 67 |  | 89 |  |
| 20 |  | 46 |  | 47 |
| 21 | 73 |  | 92 |  |
| 22 |  | 52 |  | 51 |
| 24 | 84 |  |  |  |
| 25 |  | 55 |  | 59 |
| 30 | 94 | 67 |  | 69 |

The examples show clearly that the materials of the invention build up hardness much more quickly, which leads to quicker demolding and hence to higher productivity. Moreover, the materials of the invention can likewise cure at low mold temperatures. This is advantageous since high mold temperatures are not easy to achieve in processing in the field and are found to be technologically difficult.

6. Hydrolysis Stability Experiments

As well as the short demolding times, the materials of the invention have comparable hydrolysis stability to the elastomeric epoxy resins known in the literature. This is to be illustrated in the examples which follow.

For this purpose, the constituents of the polyol component (polyols, chain extender, zeolite paste, defoamer, inventive reaction products of polyetheramines or polyols and polyepoxides etc.) were first mixed by means of a Speedmixer™ from Hauschild at 800 rpm for 20 sec and at 2000 rpm for 40 sec, and subsequently degassed under reduced pressure. Then the appropriate amount of degassed isocyanate component was added to the mixture, which was mixed in the Speedmixer™ at 2000 rpm for 40 sec. The reactive mixture was then introduced into a mold heated to 70° C. in order to produce test plaques having a thickness of 2 mm. After 2 hours at 70° C., the test plaques were demolded and, after they had been stored under standard climatic conditions for 7 days, tensile specimens were die-cut out of these test plaques, and the tensile strength and elongation were determined according to DIN 53504. A further portion of these tensile specimens was then stored in synthetic seawater in a pressure vessel at 150° C. and, at particular intervals, tensile specimens were removed, and tensile strength and elongation were determined in the freshly removed state.

The production of the epoxide-based elastomers was produced analogously to the process described in WO 2012/030339. For this purpose, the epoxide prepolymers were heated to a temperature of 50° C. and degassed. Subsequently, the amine crosslinker and the 2,4,6-tris(dimethylaminomethyl)phenol catalyst were added in the appropriate amount and mixed by means of a Speedmixer from Hauschild at 800 rpm for 30 seconds and then at 2300 rpm for 60 seconds. The reactive mixture was then introduced into a mold heated to 100° C. in order to produce test plaques having a thickness of 2 mm. After 2 hours at 100° C., the test plaques were demolded and, after being stored under standard climatic conditions for 7 days, tensile specimens were die-cut out of these test plaques, and the tensile strength and elongation were determined according to DIN 53504. A further portion of these tensile specimens was then stored in synthetic seawater in a pressure vessel at 150° C. and, at particular intervals, tensile specimens were removed, and tensile strength and elongation were determined in the freshly removed state.

Table 6 below gives information about the results. As apparent from the examples, the materials of the invention, as well as excellent stability under moist and warm conditions, also exhibit much better tensile strengths than the elastomers based on epoxy resins that are described in the prior art, with comparable stability under moist and warm conditions.

TABLE 6

|  | B26 | V13 |
| --- | --- | --- |
| Material from B 10 | 76.665 | 100 |
| KV | 16.190 | |
| ZP | 1.905 | |
| DL | 4.762 | |
| DF | 0.476 | |
| Kat2 | 0.002 | |
| AV1 | | 7.9 |
| Kat3 | | 1.6 |
| ISO 2 | 100 | — |
| Index | 103 | — |
| Mechanical properties | | |
| Tensile strength [MPa] | 25 | 8 |
| Elongation [%] | 90 | 90 |
| Hydrolysis for 7 days (150° C.) | | |
| Tensile strength [MPa] | 9 | 2 |
| Elongation [%] | 150 | 100 |
| Hydrolysis for 14 days (150° C.) | | |
| Tensile strength [MPa] | 7 | 2 |
| Elongation [%] | 220 | 90 |
| Hydrolysis for 28 days (150° C.) | | |
| Tensile strength [MPa] | 7 | 2 |
| Elongation [%] | 220 | 90 |
| Hydrolysis for 56 days (150° C.) | | |
| Tensile strength [MPa] | 7 | 2 |
| Elongation [%] | 220 | 90 |
| Hydrolysis for 98 days (150° C.) | | |
| Tensile strength [MPa] | 7 | 2 |
| Elongation [%] | 200 | 110 |

7. Preparation Examples

As well as the reaction products of polyetheramines and epoxides, it is also possible to utilize reaction products of polyols and epoxides. This is to be elucidated in the following examples:

7.1 Example B27

In a 1 L four-neck flask with stirrer, temperature sensor, reflux condenser, stopper and oil bath heater, 80 g of Epoxide 8 (Epilox A 19-03, Leuna-Harze, epoxy equivalent weight EEW=190) and 410.2 g of Poly 8 (Lupranol 1005/1) were weighed out. The mixture was homogenized and heated to 110° C. while purging with N2 and stirring. On attainment of the temperature, 2.0 g of Kat 5 were added as catalyst, a sample was taken for the EEW determination and the reaction mixture was heated cautiously to 130° C. An EEW of 1013 g/eq was determined. After one hour at reaction temperature (130-135° C.), an EEW of 2304 g/eq was measured (calculated: 2270 g/eq). The reaction mixture was cooled down and decanted into a glass bottle at about 70° C. A slightly cloudy, pale yellow viscous liquid having the following indices was obtained:
EEW: 2606 g/eq (measured)
OH number: 24 mg KOH/g (calculated)
Viscosity: 18.5 Pas (at 22° C.)

7.2 Example B28

In a 1 L four-neck flask with stirrer, temperature sensor, reflux condenser, stopper and oil bath heater, 200 g of Epoxide 8 (Epilox A 19-03, Leuna-Harze, epoxy equivalent weight EEW=190) and 410.2 g of Poly 8 (Lupranol 1005/1) were weighed out. The mixture was homogenized and heated to 110° C. while purging with N2 and stirring. On attainment of the temperature, 2.4 g of Kat 5 were added as catalyst, a sample was taken for the EEW determination and the reaction mixture was heated cautiously to 130° C. An EEW of 580 was determined. After one hour at reaction temperature (130-135° C.), an EEW of 773 was measured (calculated: 720 g/eq). The reaction mixture was cooled down and decanted into a glass bottle at about 70° C. A clear, pale yellow and slightly viscous liquid having the following indices was obtained:
EEW: 825 g/eq (measured)
OH number: 19 mg KOH/g (calculated)
Viscosity: 3.7 Pas (at 22° C.)

7.3 Example B29

In a 3 L laboratory reactor, equipped with a 3-level MIG stirrer, temperature sensor, reflux condenser, oil heater, 1600.5 g of bisphenol A diglycidyl ether (Epilox A 19-03, Leuna-Harze, epoxy equivalent weight EEW=190) and 381.2 g of Poly10 (Lupranol 1200, BASF, OHZ 248) were weighed out. The mixture was homogenized and heated to 110° C. while purging with N2 and stirring. On attainment of the temperature, 6.0 g of $BF_3$-amine complex (Anchor 1040, Air-Products) were added as catalyst, a sample was taken for the EEW determination and the reaction mixture was heated cautiously to 130° C. An EEW of 218.9 (7.31% EpO) was determined. The onset of exothermicity was accounted for by lowering the oil heating and the reaction temperature was kept between 130 and 135° C. After one hour at reaction temperature, an EEW of 287.4 (5.58% EpO) was measured. After a further hour, the EEW was 295.5 (5.41% EpO). The reaction mixture was cooled down and decanted at about 70° C. A clear, pale yellow and viscous liquid having the following indices was obtained:
EEW: 296 g/eq (measured)
OH number: 67.3 mg KOH/g
Viscosity: 36 Pas (at 22° C.)

7.4. Example B30

In a 3 L laboratory reactor, equipped with a 3-level MIG stirrer, temperature sensor, reflux condenser, oil heater, 872.0 g of bisphenol A diglycidyl ether (Epilox A 19-03, Leuna-Harze, epoxy equivalent weight EEW=190) and 1143.0 g of Poly 11 (Lupranol 2010/1, BASF, OHZ 45) were weighed out. The mixture was homogenized and heated to 110° C. while purging with N2 and stirring. On attainment of the temperature, 6.16 g of $BF_3$-amine complex (Anchor 1040, Air-Products) were added as catalyst, a sample was taken for the EEW determination and the reaction mixture was heated cautiously to 130° C. An EEW of 428.6 (3.37% EpO) was determined. The onset of exothermicity was accounted for by lowering the oil heating and the reaction temperature was kept between 130 and 135° C. After one hour at reaction temperature, an EEW of 466.6 (3.43% EpO) was measured. After two further hours, the EEW was 546.2 (2.93% EpO). The reaction mixture was cooled down and decanted at about 70° C. A clear, pale reddish yellow and slightly viscous liquid having the following indices was obtained:

EEW: 548 g/eq (measured)
Viscosity: 17.7 Pas (at 22° C.)
OH number: 36.6 mg KOH/g

7.5. Example B 31

In a 3 L laboratory reactor, equipped with a 3-level MIG stirrer, temperature sensor, reflux condenser, oil heater, 670.4 g of bisphenol A diglycidyl ether (Epilox A 19-03, Leuna-Harze, epoxy equivalent weight EEW=190) and 1410.3 g of Poly6 (Lupranol 2090, BASF, OHZ 28) were weighed out. The mixture was homogenized and heated to 110° C. while purging with N2 and stirring. On attainment of the temperature, 6.3 g of BF$_3$-amine complex (Anchor 1040, Air-Products) were added as catalyst, a sample was taken for the EEW determination and the reaction mixture was heated cautiously to 130° C. An EEW of 573 (2.79% EpO) was determined. The onset of exothermicity was accounted for by lowering the oil heating and the reaction temperature was kept between 130 and 135° C. After one hour at reaction temperature, an EEW of 632 (2.53% EpO) was measured. After a further 1.5 hours of reaction time, the EEW was 884 (1.81% EpO). The reaction mixture was cooled down and decanted at about 70° C. A clear, pale yellow and very viscous liquid having the following indices was obtained:

EEW: 941 g/eq (measured)
Viscosity: 268 Pas (at 22° C.)
OH number: 29.4 mg KOH/g It is also possible to use the reaction products of the invention based on polyols and epoxides as raw materials for the preparation of the polyurethanes of the invention.

For this purpose, the constituents of the polyol component (polyols, chain extender, zeolite paste, defoamer, inventive reaction products of polyols and polyepoxides etc.) were first mixed by means of a Speedmixer™ from Hauschild at 800 rpm for 20 sec and at 2000 rpm for 40 sec, and subsequently degassed under reduced pressure and heated to 50° C. Then the appropriate amount of degassed isocyanate component (50° C.) was added to the mixture, which was mixed in the Speedmixer™ at 2000 rpm for 40 sec. The reactive mixture was then introduced into a mold heated to 50° C. in order to produce test plaques having a thickness of 2 mm. After the casting, the temperature was increased to 80° C. and the materials were stored at this temperature for 2 hours. Thereafter, the test plaques were demolded and, after they had been stored under standard climatic conditions for 7 days, tensile specimens were die-cut out of these test plaques, and the tensile strength and elongation were determined according to DIN 53504. A further portion of these tensile specimens was then stored at 130° C. in water vapor for 5, 10 or 15 hours, and then the tensile strength and elongation were determined according to DIN 53504.

TABLE 7

|  | B32 | B33 | B34 |
|---|---|---|---|
| Poly 9 |  | 5.000 |  |
| Material from B 27 | 81.000 |  |  |
| Material from B 28 |  | 76.000 |  |
| Material from B 30 |  |  | 81.000 |
| KV | 15.000 | 15.000 | 15.000 |
| ZP | 3.500 | 3.500 | 3.500 |
| DF | 0.500 | 0.500 | 0.500 |
| Kat2 | 0.001 | 0.001 |  |
| Kat6 |  |  | 0.003 |
| ISO 4 | X | X | X |
| Index | 103 | 103 | 103 |
| 0 h at 130° C./water vapor |  |  |  |
| Tensile strength [MPa] | 7 | 18 | 23 |
| Elongation [%] | 70 | 80 | 140 |
| 5 h at 130° C./water vapor |  |  |  |
| Tensile strength [MPa] | 12 | 30 | 35 |
| Elongation [%] | 80 | 80 | 80 |
| 10 h at 130° C./water vapor |  |  |  |
| Tensile strength [MPa] | 15 | 23 | 40 |
| Elongation [%] | 100 | 80 | 80 |
| 15 h at 130° C./water vapor |  |  |  |
| Tensile strength [MPa] | 17 | 35 | 39 |
| Elongation [%] | 120 | 70 | 80 |

8. Examples Relating to the Prior Art (Experiments V14-V16 and B35)

For experiments V14-V16 & B35, a 500 mL four-neck flask with stirrer, nitrogen inlet and condenser was initially charged with the appropriate amounts of Polyol 6 together with Epoxide 2, which were mixed homogeneously at room temperature. After the components had been mixed homogeneously, a sample was taken in order to determine the viscosity of the mixture at 23° C. Thereafter, the temperature was increased to 60° C. in experiments V14 & V15 and kept at this temperature for 3 h, analogously to the manner described in U.S. Pat. No. 4,647,624 Example 2. After the 3 hours, the mixture was cooled down and the viscosity was determined again. The procedure was similar to that in V16 & B35, except that a temperature of 130° C. was used here for the synthesis and, in the case of B35, on attainment of 100° C., Kat 5 was added to the mixture. After 3 hours at 130° C., the materials from V16 & B35 were cooled down and the viscosity of the mixture was determined again at 23° C.

TABLE 8

|  | V14 | V15 | V16 | B35 |
|---|---|---|---|---|
| Poly 6 | 285.00 g | 180.00 g | 180.00 g | 179.25 g |
| Epoxide 2 | 15.00 g | 120.00 g | 120.00 g | 120.00 g |
| Kat 5 |  |  |  | 0.75 g |
| Viscosity at 23° C. after mixing [mPas] | 1290 | 2670 | 2670 | 2650 |
| Viscosity at 23° C. after 3 h/60° C. [mPas] | 1300 | 2580 |  |  |
| Viscosity at 23° C. after 3 h/130° C. [mPas] |  |  | 2560 | 6760 |

As can be seen from comparative examples V14-V16, there is no change in the viscosity of the mixture since no significant reaction takes place between polyol & polyepoxide. In the case of B35, a distinct rise in viscosity is observed. This means that, in the examples described by U.S. Pat. No. 4,647,624, none of the structures of the invention has been generated; instead, this is still a mixture of polyol and polyepoxide, analogously to the manner described in comparative examples V4 & V5. The materials that are described in V4 & V5 reflect the prior art and show poor long-term hydrolysis properties.

Moreover, it becomes clear from examples V14-V16 and B35 that an appropriate catalyst is required for the preparation of the reaction products of the invention from polyetherols and polyepoxides.

The invention claimed is:

1. A process for preparing a polyurethane, comprising the reaction of at least the following components:
   (i) composition (Z1) at least comprising a compound (P1) reactive toward isocyanates, and
   (ii) composition (Z2) at least comprising a polyisocyanate,
   wherein compound (P1) is obtained by the reaction of a polyepoxide with a compound (V1) selected from the group consisting of polyetheramines and polyetherols,
   wherein the ratio of the polyetheramine NH groups or the polyetherol OH groups to the polyepoxide epoxy groups is from 1:1.5 to 1:75, and
   wherein the polyepoxide consists of at least one polyepoxide having an epoxy equivalent weight of between 100 and 250.

2. The process for preparing a polyurethane according to claim 1, wherein at least one of the following components is used in the reaction in addition to components (i) and (ii)
   (iii) a further compound reactive toward isocyanates,
   (iv) a chain extender,
   (v) further additives.

3. The process for preparing a polyurethane according to claim 1, wherein compound (P1) has a theoretically calculated OH number in the range from 0.5 mg KOH/g to 75 mg KOH/g.

4. The process for preparing a polyurethane according to claim 1, wherein compound (P1) has a theoretically calculated epoxy equivalent weight in the range from 180 to 5000 g/eq.

5. The process for preparing a polyurethane according to claim 1, wherein compound (V1) is a polyetheramine having a molecular weight in the range from 500 to 30,000 g/mol.

6. The process for preparing a polyurethane according to claim 1, wherein compound (V1) is a polyetherol having a molecular weight in the range from 500 to 30,000 g/mol.

7. The process for preparing a polyurethane according to claim 1, wherein the polyisocyanate is an aromatic polyisocyanate.

8. The process for preparing a polyurethane according to claim 1, wherein the polyisocyanate has an NCO content of 2% to 33.5%.

9. The process for preparing a polyurethane according to claim 1, wherein a catalyst is used.

10. The process for preparing a polyurethane according to claim 9, wherein the proportion of catalysts in composition (Z1) is in the range from 0.00001% by weight to 5% by weight.

11. A polyurethane obtained by a process according to claim 1.

12. The polyurethane according to claim 11, wherein the polyurethane is a compact polyurethane.

13. The polyurethane according to claim 11, wherein the polyurethane is a cast elastomer.

14. The polyurethane according to claim 11, wherein the polyurethane is suitable for use as at least one of a coating of pipelines, as a field joint or for subsea equipment for the offshore sector.

15. The polyurethane according to claim 11, wherein the polyurethane is suitable for use as a glass syntactic polyurethane.

16. A reaction product of a compound (P1) reactive toward isocyanates and composition (Z2) at least comprising a polyisocyanate, wherein compound (P1) is obtained by the reaction of a polyepoxide with a compound (V1) selected from the group consisting of polyetheramines and polyetherols, wherein the polyepoxide consists of at least one polyepoxide having an epoxy equivalent weight of between 100 and 250, and the ratio of the polyetheramine NH groups or the polyetherol OH groups to the polyepoxide epoxy groups is from 1:1.5 to 1:75.

* * * * *